United States Patent [19]

Epple

[11] 3,755,100

[45] Aug. 28, 1973

[54] METHOD FOR PRODUCING ACRYLAMIDE FROM ACRYLONITRILE

[75] Inventor: Donald G. Epple, Oaklawn, Ill.

[73] Assignee: Nalco Chemical Company, Chicago, Ill.

[22] Filed: June 9, 1972

[21] Appl. No.: 263,745

[52] U.S. Cl............ 204/74, 204/73 R, 204/73 A, 260/557 R, 260/561 N
[51] Int. Cl.................C07b 29/06, C07c 103/08, C07c 103/12
[58] Field of Search ...204/72–76; 260/557 R, 561 N

[56] References Cited
UNITED STATES PATENTS 3,193,478  7/1965  Baizer............................... 204/73 A
3,381,034  4/1968  Greene et al. ................... 260/557 R
3,616,320  10/1971  Beck et al.......................... 204/73 A
3,631,104  12/1971  Habermann et al. ........... 260/561 N Primary Examiner—E. C. Edmundson
Attorney—John G. Premo et al.

[57] ABSTRACT

Dilute aqueous solutions of acrylonitrile, the pH of which is adjusted to 10–14, may be electrolyzed using A.C. current and copper electrodes to produce acrylamide.

2 Claims, No Drawings

METHOD FOR PRODUCING ACRYLAMIDE FROM ACRYLONITRILE

Several methods are now known for producing acrylamide based on the hydrolysis of acrylonitrile. One such method is the acid hydrolysis of acrylonitrile. This method is not too desirable from a manufacturer's standpoint since inorganic salts are produced as a by-product, which salts are difficult to dispose of in an economical and pollution-free manner.

Another method for converting acrylonitrile to acrylamide resides in the catalytic hydrolysis of acrylonitrile in water, using a variety of catalysts such as, for instance, the oxides or reduced oxides of copper, zinc, silver, as well as these compounds supported on a carrier. While this hydrolytic approach has certain advantages, it still necessitates that the catalyst be separated from the finished product. Also, the cost of these catalysts both with respect to the materials used to prepare the catalyst as well as the minipulative steps required, to treat the catalyst to convert it to an active species add to the costs and disadvantages of the process.

If it were possible to provide a simple, substantially pollution-free method for rapidly and economically converting acrylonitrile to acrylamide, an advantage to the art would be afforded.

INVENTION

In accordance with the invention, it has been found that dilute aqueous solutions of acrylonitrile may be efficiently hydrolyzed electrolytically using copper electrodes and an A.C. current to produce acrylamide. An important aspect of the invention is the pH of the acrylonitrile solution during its electrolysis. The pH is generally within the range of 10-14. Most preferably, it is within the pH range of 9.5-13.5.

pH ADJUSTMENT

The pH of the acrylonitrile solution may be adjusted by using an inorganic basic compound or basic organic nitrogen compound, the basisity of which is sufficient to impart to the solution of pH within the ranges ennumerated above.

For instance, good results have been achieved by using sodium hydroxide, sodium carbonate or mixtures thereof. Good results are also achieved when the reaction is run using as the pH adjustment chemical, a strong water soluble amine or quaternary ammonium hydroxide or salt.

The pH, as indicated, is critical in allowing the hydrolysis of the nitrile solution to proceed rapidly using minimum amounts of current.

CONDITIONS OF THE ELECTROLYSIS

In conducting the electrolysis, conventional electrolytical apparatus may be employed. The electrodes, as indicated, are formed from copper which may be in the shape of rods, bars, screens and the like. In certain types of electrolytic cells, the electrolysis vessel may be formed of copper, and be utilized as an electrode. Similarly, copper shot or powder contained in a suitable porous container may be employed as an electrode.

The alternating current may have a frequency range between 60-120 cycles per. sec., although in certain instances the frequency may be as high as 500 cycles per. sec. In addition to using alternating current as such, square wave D. C. current may be used, the frequency of which may be as low as one cycle per. sec. The amount of current used to conduct the electrolysis may be varied between as little as 0.1 amp to as high as 100 amps, although good results are achieved when the current ranges between 0.5-20 amps.

The time required to partially or completely hydrolyze reasonable quantities of the acrylonitrile may vary between ½ hour and 24 hours. The particular time will depend upon the construction of the cells, the temperature of the reaction, the current, and the frequency of the current.

The reaction is perferably run at room temperature, although in most instances the electrical reaction generates heat. When heat is employed, it should be controlled so that the reaction temperature does not exceed the boiling point of either the water of acrylonitrile. The acrylonitrile solutions may contain from about 1 percent to about 10 percent by weight of the acrylonitrile.

EXAMPLE I

To illustrate the invention, the following are presented by way of Example. In all cases, unless stated otherwise, the acrylonitrile solutions electrolyzed, contained 7 percent by weight. All of the experiments used standard laboratory electrolytic cells.

CONDITIONS 115 v. A.C. line voltage was lowered to 15/20 of its value by means of a transformer. The pH of a 4 percent solution of acrylonitrile was adjusted to 13.5 with a mixture of sodium carbonate & sodium hydroxide.

RESULTS

| Time | % Acrylamide |
|---|---|
| 1 min. | <0.006 |
| 5 min. | 0.006 |
| 15 min. | 0.01 |
| 1 hour | 0.07 |
| 1.5 hour | 0.06 |

EXAMPLE II

The same test procedure as in Exmple I except that square wave DC 1 cycle per second at 0.5 amps was used. Tetramethyl ammonium hydroxide was used in place of NaOH - $Na_2CO_3$. The results are presented below:

| Time 2/22/ | & Acrylamide (wt./vol.) | % ACN wt./vol. |
|---|---|---|
| B (Blank) | 0.02% | 2.7% |
| 1 (2 hrs.) | 0.60% | 2.0% |
| 2 (4 hrs.) | 0.50% | 1.3% |
| 3 (24 hrs.) | 0.20% | 1.4% |

In each of the above Examples the acrylamide was separated from the residual acrylonitrile solution and recovered as a finished product.

I claim:

1. A method for producing acrylamide from acrylonitrile which comprises the steps of electrolyzing with an alternating current and a copper electrode an aqueous solution of acrylonitrile the pH of which has been adjusted with an electrolyte to between 9.5-14, continuing said electrolysis until a portion of the acrylonitrile has been converted to acrylamide and then separating and recovering the acrylamide.

2. The method of claim 1 where the pH is within the range of 10-14.

* * * * *